US010267029B2

(12) United States Patent
Kent et al.

(10) Patent No.: US 10,267,029 B2
(45) Date of Patent: *Apr. 23, 2019

(54) MODULAR TESSELLATION ASSEMBLY FOR STORAGE OF WATER UNDERGROUND

(71) Applicant: Bio Clean Environmental Services, Inc., Oceanside, CA (US)

(72) Inventors: Zachariha J. Kent, San Antonio, TX (US); John Scott, Oceanside, CA (US)

(73) Assignee: Bio Clean Enviromental Services, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,398

(22) Filed: Aug. 2, 2017

(65) Prior Publication Data

US 2017/0328052 A1 Nov. 16, 2017

Related U.S. Application Data

(63) Continuation of application No. 15/135,514, filed on Apr. 21, 2016, now Pat. No. 9,732,508.

(51) Int. Cl.
*E03F 1/00* (2006.01)
*E02B 11/00* (2006.01)

(52) U.S. Cl.
CPC .............. *E03F 1/003* (2013.01); *E02B 11/00* (2013.01); *E03F 1/002* (2013.01); *E03F 1/005* (2013.01)

(58) Field of Classification Search
CPC ........... E03F 1/003; E03F 1/005; E02B 11/00; E02B 11/005
See application file for complete search history.

(56) References Cited

U.S. PATENT DOCUMENTS

| 5,017,042 | A | 5/1991 | Minor |
| 5,810,510 | A | 9/1998 | Urriola |
| 5,848,856 | A | 12/1998 | Bohnhoff |
| 6,095,718 | A | 8/2000 | Bohnhoff |
| 6,419,421 | B1 | 7/2002 | Whitfield, Jr. |
| 6,991,402 | B2 * | 1/2006 | Burkhart ................. E03F 1/005 405/126 |
| 7,080,480 | B2 | 7/2006 | Urban |

(Continued)

FOREIGN PATENT DOCUMENTS

| DE | 44 00 183 | * 7/1995 |
| GB | 2417733 A | 3/2006 |
| WO | 2013159737 A1 | 10/2013 |

OTHER PUBLICATIONS

Almanstoetter Juergen DIPL PHY, "Hexagonal drainage elements assembled as drainage lining for open refuse tip", Notification date Feb. 7, 2018, Translation DE9319264 U1 (Original Doc. published Jul. 6, 1995), 6 pages.

*Primary Examiner* — Frederick L Lagman
(74) *Attorney, Agent, or Firm* — Steven W. Webb

(57) ABSTRACT

Individual hexagonal shaped modules used in an assembly for underground storage of storm water and other fluid storage needs. Modules are assembled into a resultant honeycomb shape for maximized structural strength and material use efficiency. Adjacent modules are in direct fluid communications with one another via openings or windows in module side walls. Assemblies include various top and side pieces along with access ports for entry into said assembly.

24 Claims, 20 Drawing Sheets

(56) References Cited

U.S. PATENT DOCUMENTS

| | | | |
|---|---|---|---|
| 7,160,058 B2 * | 1/2007 | Burkhart | E03F 1/005 |
| | | | 405/126 |
| 7,344,335 B2 * | 3/2008 | Burkhart | E03F 1/005 |
| | | | 405/126 |
| 7,591,610 B2 | 9/2009 | Krichten | |
| 7,621,695 B2 | 11/2009 | Smith | |
| 8,360,100 B2 * | 1/2013 | Burkhart, Sr. | E03F 5/101 |
| | | | 137/265 |
| 8,590,564 B2 * | 11/2013 | Burkhart, Sr. | E03F 5/101 |
| | | | 137/265 |
| D767,924 S | 10/2016 | Livingston | |
| D786,510 S | 5/2017 | Murljacic | |
| D795,384 S | 8/2017 | Kent | |
| 9,732,508 B1 * | 8/2017 | Kent | E03F 1/002 |
| D810,857 S | 2/2018 | Zarraonandia | |
| D810,858 S | 2/2018 | Zarraonandia | |
| 2004/0076473 A1 | 4/2004 | Burkhart | |
| 2007/0053746 A1 | 3/2007 | Dickie | |
| 2007/0181197 A1 | 8/2007 | Krichten | |
| 2007/0217866 A1 | 9/2007 | Oscar | |
| 2008/0166182 A1 | 7/2008 | Smith | |
| 2009/0049760 A1 | 2/2009 | Allard | |
| 2009/0279953 A1 | 11/2009 | Allard | |
| 2010/0021236 A1 | 1/2010 | Kreikemeier | |
| 2010/0226721 A1 * | 9/2010 | May | E03F 1/002 |
| | | | 405/126 |
| 2011/0253238 A1 | 10/2011 | Burkhart, Sr. | |
| 2014/0105684 A1 | 4/2014 | Allard | |
| 2014/0291221 A1 | 10/2014 | Adams | |
| 2016/0097175 A1 | 4/2016 | Parker | |
| 2016/0265209 A1 | 9/2016 | Graf | |
| 2016/0333566 A1 | 11/2016 | Zarraonandia | |

* cited by examiner

FIG. 7
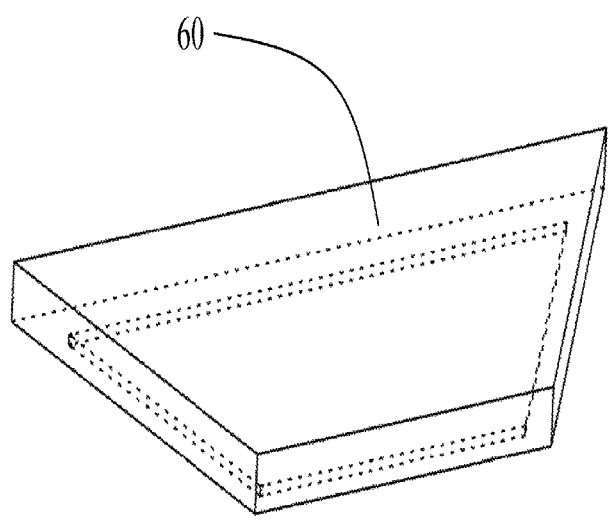
TOP VIEW
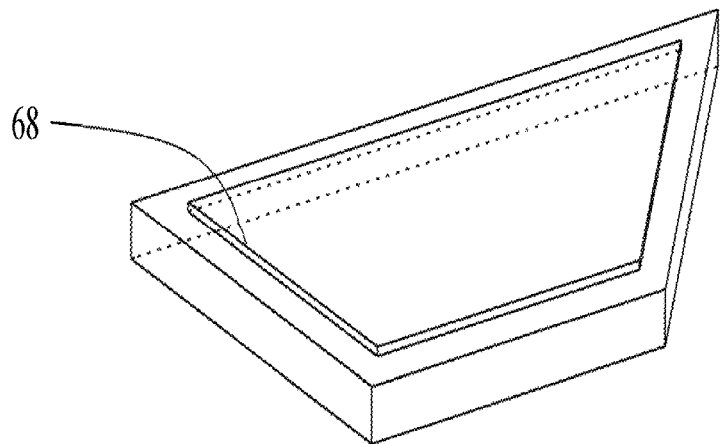
BOTTOM VIEW

FIG. 8
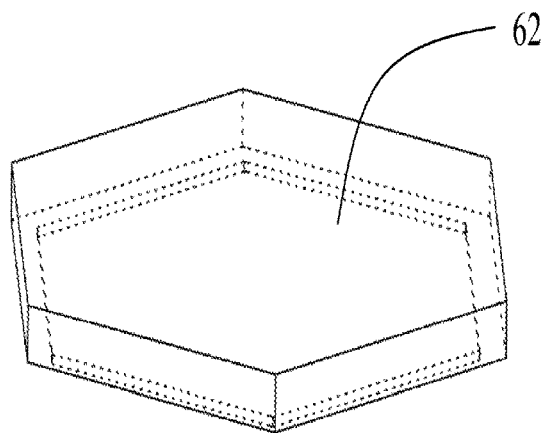
TOP VIEW
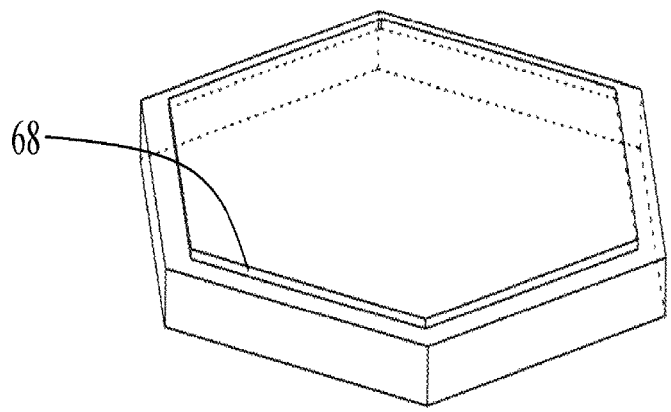
BOTTOM VIEW

FIG. 9
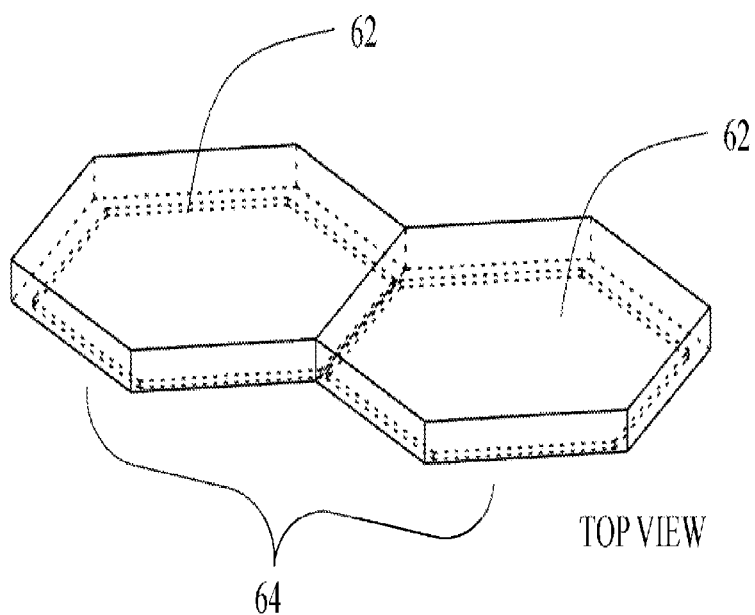
TOP VIEW
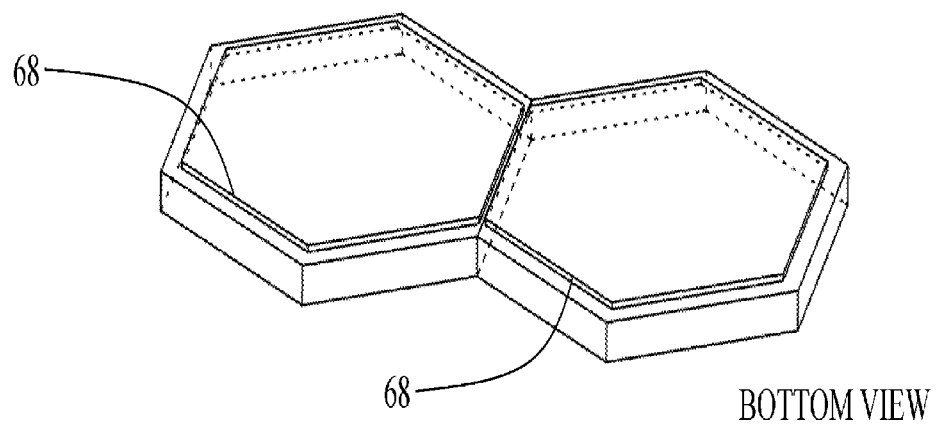
BOTTOM VIEW

MODULAR TESSELLATION ASSEMBLY FOR STORAGE OF WATER UNDERGROUND

The present application is a Continuation of U.S. Nonprovisional patent application Ser. No. 15/135,514, filed on Apr. 21, 2016 now U.S. Pat. No. 9,732,508, issued on Aug. 15, 2017. Additionally, the subject matter of the present application is related to the following patent applications U.S. Design Patent Application No. 29/567,711 filed on Jun. 10, 2016; U.S. Design Patent Application No. 29/567,713, filed on Jun. 10, 2016 and U.S. Design Patent Application No. 29/571,016, filed on Jul. 13, 2016. The above-referenced applications, including the drawings, are specifically incorporated by reference herein in their entirety for all that they disclose and teach and for all purposes.

FIELD OF THE INVENTION

The present invention relates, in general, to subterranean water capture, storage, infiltration, use system and methods of using the same. More particularly, the present invention relates to modular, underground hexagonal shaped module (s) and resulting honeycombed shaped assemblies for storage of storm water and other stored fluid needs.

BACKGROUND

Fluid storage systems have been in existence for many years, specifically underground storage systems for the collection and storage of water. While water is collected underground for various reasons, over the past 20 years there has been increased focus on collecting and storing storm water runoff. This is done because of two main concerns. The quantity of storm water runoff is a concern because larger volumes of associated runoff can cause erosion and flooding. Quality of stormwater runoff is a concern because storm water runoff flows into our rivers, streams, lakes, wetlands, and/or oceans. Larger volumes of polluted storm water runoff flowing into such bodies of water can have significant adverse effects on the health of ecosystems.

The Clean Water Act of 1972 enacted laws to improve water infrastructure and quality. Storm water runoff is the major contributor to non-point source pollution. Studies have revealed that contaminated storm water runoff is the leading cause of pollution to our waterways. As we build houses, buildings, parking lots, roads, and other impervious surfaces, we increase the amount of water that runs into our storm water drainage systems and eventually flows into rivers, lakes, streams, wetlands, and/or oceans. As more land becomes impervious, less rain seeps into the ground, resulting in less groundwater recharge and higher velocity surface flows, which cause erosion and increased pollution levels of water bodies and the environment.

To combat these storm water challenges associated with urbanization storm water detention and retention methods have been developed to help mitigate the impact of increased runoff. Historically, open detention basins, wetlands, ponds or other open systems have been employed to capture storm water runoff with the intention of detaining and slowly releasing downstream over time at low flows using outlet flow controls, storing and slowly infiltrating back into the soils below to maximize groundwater recharge or retain and use for irrigation or other recycled water needs. While the open systems are very effective and efficient the cost of the land associated with these systems can make them prohibitive. In areas such as cities or more densely populated suburbs the cost of land or availability of space has become limited. In these areas many developers and municipalities have turned to the use of underground storage systems which allow roads, parking lots, and building to be placed over the top of them.

A wide range of underground storage systems exist, specifically for the storage of storm water runoff. Arrays of pipes, placed side-by-side are used to store water. Pipe systems made of concrete, plastic or corrugated steel have been used. More recently arched plastic chamber systems have been in use. As with pipes, rock backfill is used to fill the space surrounding them to create added void areas for storing additional water along with providing additional structural reinforcement.

In general, these types of systems require at least one foot of rock backfill over the top and at least one or more feet of additional native soil over the top to support the loading associated with vehicles on streets and parking lots. These systems also require rock backfill of a foot or more around their perimeter sides to provide structural reinforcement due to lateral loading associated with soil pressure.

Lastly, these systems most also be placed on a rock base for structural support. Because these system are round or arched a substantial amount of rock backfill must be used to surround them and placed in between them. As such, the amount of void space available for storing water compared to the amount of soil required to be excavated is only around 60%.

Over time, plastic and concrete rectangular or cube shaped modular systems were developed that more efficiently stored storm water because the modules could be placed side-to-side and end-to-end without the need for additional rock backfill to be placed between each module as found with pipe and arched systems. With these rectangular and cube shaped systems the void space available for storing water compared to the amount of soil required to be excavated is up to 90% plus. While plastic type rectangular and cubes systems still require at two feet of rock backfill over the top, two feet round the perimeter sides, and six inches underneath to handle downward and lateral loading, the concrete rectangular and cubed systems do not.

Concrete rectangular or cubed modular systems have the benefit of not requiring rock backfill over the top or surrounding the sides because of their additional strength when compared to plastic systems. Yet, these rectangular or cubed concrete structures still have depth limitations due to the lateral loading associated with soil pressure.

For example, currently available concrete systems cannot have the bottom of the structure be deeper than eighteen feet below surface level without modifying the standard wall thickness of the structure from six inches to eight inches or more plus adding additional rebar reinforcement. Doing so adds cost, weight and complexity to design. This inherent design limitation is related directly to the shape and design of these structures.

Concrete rectangular or cube shaped structures have five sides, four vertically extending walls and a bottom or top side. One side must be open because of how pre-cast concrete molds are made and how the concrete structure is pulled from the mold. At least one side of the concrete structure must be missing for it to be pulled from the metal mold that consists of inner and outer walls and either a top or bottom side.

Unfortunately this missing side, required for manufacturing, creates an inherent weak point for the walls. The middle of each wall, especially the longer walls for rectangular structures, where the wall meets the end of the missing top or bottom side has no perpendicular connection as with the opposite side of the same wall where it connects to the top or bottom side. This weak point on the center of each wall at the open end is the reason why these systems have depth limitations. This is known as deflection. This weak point becomes further exaggerated the taller the wall becomes and the longer it becomes; the further away it is from the perpendicular connecting floor or adjacent wall on the opposite end. Therefore, taller systems which extend down deeper from the surface underground run into a compounding problem of taller walls and increased lateral loading (soil pressure).

Furthermore, there are also equipment limitations with concrete rectangular or cubed shaped structures. Most precast concrete plants utilize an overhead crane inside a metal building. The height of this crane is a limitation on how tall a single five sided, four walls and a top or bottom side, structure can be. The process of pulling a concrete casting from the mold requires it to be pulled up from the mold, opposite of the open side, sliding the walls out from between the inner and out mold walls.

Because of this method, generally the walls of these concrete structures are not greater than seven feet tall. Therefore, in order to make a taller overall structure, two shorter structures must be stacked on top of each other in a "clamshell" configuration with open ends facing each other so that the joined structure has one top and one bottom. Once again, the weak point being in the middle of each wall, horizontally, on the end opposite of the perpendicular connecting top or bottom side.

Lastly, current designs of concrete rectangular or cubed shaped structures, have limitations related to shipping, primarily on large flatbed trucks. These trucks have transportation limits on weight, length, width and height. Standard flatbed trucks are forty feet long. A standard load width is eight feet. Wide load up to twelve feet. Anything wider requires pilot cars and an escort which is very expensive. Also, height limitations are generally eight feet to be transported on most interstates due to overpasses. Standard weight limitations are forty-five thousand pounds. When designing these structures it is important to make the structure as large as possible without exceeding the shipping limitations to maximize feasibility due to economies of scale.

As explained, current design of underground systems have limitations related to loads from above and from the sides. These systems must be designed without risk of cracking, collapsing or other types of structural failure. Concrete rectangular or cubed structures have inherent weak points which limit the depth at which they are installed with standard wall thicknesses and design. The inherent flaw is related to the basic shape of the structure which has walls running perpendicular and parallel to one another.

The need for a system that overcomes these inherent shape related limitations is evident. The solution lies within utilizing principles of biomimetics and studying efficient structures found in nature and utilizing these more efficient natural shapes in combination with current precast concrete design processes to create a system that overcomes the limitations of the current available technologies.

One of the most efficient structures in nature is the honeycomb which is found in beehives, honeycomb weathering in rocks, tripe and bone. The related hexagon shape has been found to make the most efficient use of space and building materials. Throughout history this structure has been admired to be very light, strong and structurally efficient. While this technology has been applied to paper products, composite materials, metals like aluminum, plastics, and carbon nanotubes it has never been applied to modular precast concrete structures, let alone structures used for the underground storage of storm water or other fluids.

SUMMARY OF INVENTIONS

The present embodiment, is depicted, in one of its many aspects, as a module and an assembly of modules for collection, storage, infiltration of water, and specifically storm water runoff underground. The uniqueness of the shape of each module and the way in which modules are assembled creates a honeycomb structure for maximized strength with minimized use of material. The hexagonal shape provides superior strength on all sides of each module and the assembly as a whole when compared to any rectangular or cubed shaped module. Its ability to equally distribute loads from the earth on its sides allows it to be installed deeper with reduced wall thickness and rebar reinforcing.

Like squares and equilateral triangles, hexagons fit together without any gaps, and are useful form for constructing tessellations which are useful for assemblies a several individual modules that can be used to assemble modular underground concrete storage structures. In a hexagonal grid each line is as short as it can possibly be if a large area is to be filled with the fewest number of hexagons. This means the honeycomb shaped structures require less material and gains strength under compression which makes it the optimal design for underground water storage structures which are constantly being compressed by lateral and downward forces associated with being buried underground. Only hexagon and triangle shaped lattices have line segments converging at 60 and 120 degree angles preventing shearing or collapsing—they balance each other out and distribute the load evenly.

In one example, a single hexagonal module, can be used to store storm water runoff underground. Its shape equally distributes the load from each of its six vertically extending walls to the two adjacent walls running sixty degrees from it. All walls of the structure are solid. This module can be placed with an open bottom on a concrete slab and made water tight with a sealant at the bottom seam or on a rock base to allow for infiltration of stored water back into the soil below. It can also be flipped upside down with a flat top slap piece over the top of the module. Additionally, two modules, a top half and a bottom half can be joined together in the middle, with the bottom module having a bottom and an open top, and a top module having a top and open bottom to create a taller overall two piece module.

In another example, in order to create a larger overall underground storage system, windows can be placed in one or more side walls of the single or two piece module (top and bottom half). Where windows are present in one or more sides, it can be placed side-by-side to another module, also with a window in the same side in which the modules are placed together. Thus allowing them to be in fluid communication with one another.

This process can be repeated into very larger module assemblies. Two modules side by side, in fluid communication, can be further joined by another module, by adding one more windows to each of the two currently joined modules, to create a three module assembly which are all in direct fluid communications with one another. One hexagon module having six sides, and therefore can have six windows, can be in direct fluid communication with six additional modules of the same size. This makes for more efficient fluid communication and flow between hexagonal modules when compared to rectangular or cubed modules which can only be in direct fluid communication with up to four additional modules. As more modules are added to this hexagonal module assembly a honeycomb shaped structure is formed. This honeycomb shaped assembly itself provides structural benefits over traditional rectangular and cubed designs.

A further benefit, of a hexagonal module assembly resembling a honeycomb, is the strength of the overall assembly around its perimeter. Because each row and column of a hexagonal module is offset along the next row or column of modules, each perimeter module, except for corner modules, makes contact with four adjacent modules, two to its sides and two along the next inner adjacent row or column. The orientation of the modules to one another in a honeycomb pattern provides additional strength for module assemblies. As the assembly adds more modules, opportunity arises to be able to remove a significant number of internal modules without sacrificing strength due to the honeycomb shape of the modules.

Removing internal modules improves efficiency, reduces cost, reduces assembly time and minimizes material use. In some instances two adjacent internal modules can be removed further increasing efficiency and reducing material usage without sacrificing strength. Where modules are removed, concrete top slabs can be used to cover these internal voids. Additional top slabs and side walls can be added to end walls to maximize storage space based on the amount of individual modules used and the overall shape of the assembly.

BRIEF DESCRIPTION OF THE DRAWINGS

FIG. 7 is a perspective view (from top and from bottom) of a half-hexagonal top slab used in a completed hexagonal storage system assembly and placed over a hexagonal module assembly internal void area.

FIG. 8 is a perspective view (from top and from bottom) of a hexagonal top slab used in a completed hexagonal storage system assembly and placed over a hexagonal module assembly internal void area.

FIG. 9 is a perspective view (from top and from bottom) of a double hexagonal top slab used in a completed hexagonal storage system assembly and placed over a hexagonal module assembly internal void area.

DETAILED DESCRIPTION

Figure 1:
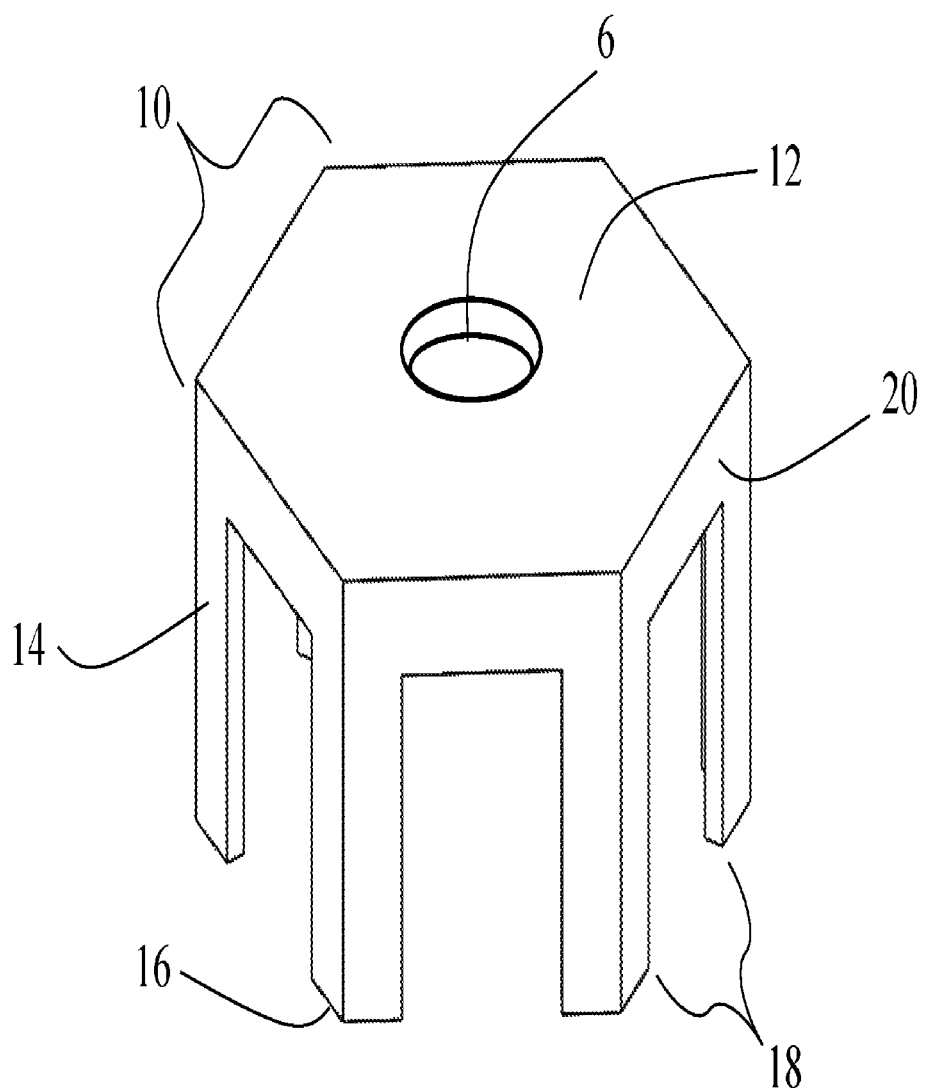
FIG. 1 is a perspective view of the hexagonal top module illustrating the modules top, legs and windows.

The present embodiment provides a hexagonal module and assembly of modules for the underground collection and storage of water. The hexagonal modules offer enhanced strength and efficiency individually and in assembly of multiple modules. Modules can be assembled into various shapes and sizes, all being of a honeycomb pattern, to meet the size, space and shape restrictions of locations where the assemblies are being installed.

The module assembly can be generally square, round, rectangular, L-shaped or other shapes to work around other underground structures, including but not limited to sewer lines, utilities, fuel storage tanks, water mains and others. The hexagonal shape and resulting honeycomb assembly provides greatly improved strength at increased depths when compared to currently available technologies and thus overcomes limitations with lateral soil pressures which increase proportionately to the depth below the ground surface.

Hexagonal modules and resulting honeycomb assemblies can be installed at various depths and at various module heights. The top of the top module can be flush with the ground surface and placed in parking lots, landscape areas, sidewalks, airports, ports and streets and can be designed to handle site specific loading conditions such as parkway, indirect traffic, direct traffic and others. The module and assembly can also be placed deeper underground with the top of the top module being from a few inches to several dozen feet below finish surface due to its high strength design. The height of the individual modules or resulting assembled two piece module can be from a few feet to over a few dozen feet in height.

The hexagonal shape and honeycomb assembly will allow this system, used for storage of fluids, to be installed deeper underground and be able to handle increased pressure and soil loads due to its shape without need to increase the wall thickness of the modules or increase the amount of rebar reinforcing therefore decreasing material and overall cost of deep installations. This is a major benefit over existing technologies or methods.

The design of the module's windows and the way modules join together with up to one module being in direct fluid communication with six other modules promotes unrestricted water flow between modules in all directions. This results in a more hydraulically efficient system and allows for fluid to evenly disburse through the assembly and minimize drag, velocities within the system, head loss and in turn enhance the system's ability to capture pollutants contained within the incoming storm water runoff, especially pollutants such as trash, sediment and TSS which are more easily removed when velocities are reduced via settling. Drainage notches at the bottom of each window allow for storm water to fully drain out to the floor preventing standing water.

Modifications of the window heights in specific chambers can also be made near inflow points to act as pre-treatment settling chambers. Specific chambers near outlet points can be modified to include treatment devices or methods such as media filters, membrane filters, biofilters to further treat storm water runoff before leaving the system.

The modules can be set up with the bottom module having a solid floor section to detain or retain water. Joint lines between modules can be sealed with a waterproof sealant or the entire module assembly wrapped in a plastic liner to make the storage system water tight. If infiltration of storm water into native soil is allowable or desired, the floor of each bottom module can include a drainage hole to allow captured storm water to exit the bottom of each module into the underlying rock base layer and or native soil for ground water recharge.

FIG. 1 shows a hexagonal top module 10 designed to collect and store water underground. The hexagonal top module is composed of a hexagonal shaped top 12 and six side walls 20. Each wall 20 can also have an optional window 18 that is narrower than the side wall 20 itself. The height of the window 18 can be equal to or less than the height of side wall 20. When two adjacent side walls 20 both have windows 18 the remaining portion of the side walls 20 is called the top module leg 14. Each leg has a bottom 16 which rests on the ground of the excavated area. The base of that excavated area can be either soil, compacted gravel base or a concrete slab depending on the use.

Figure 2:
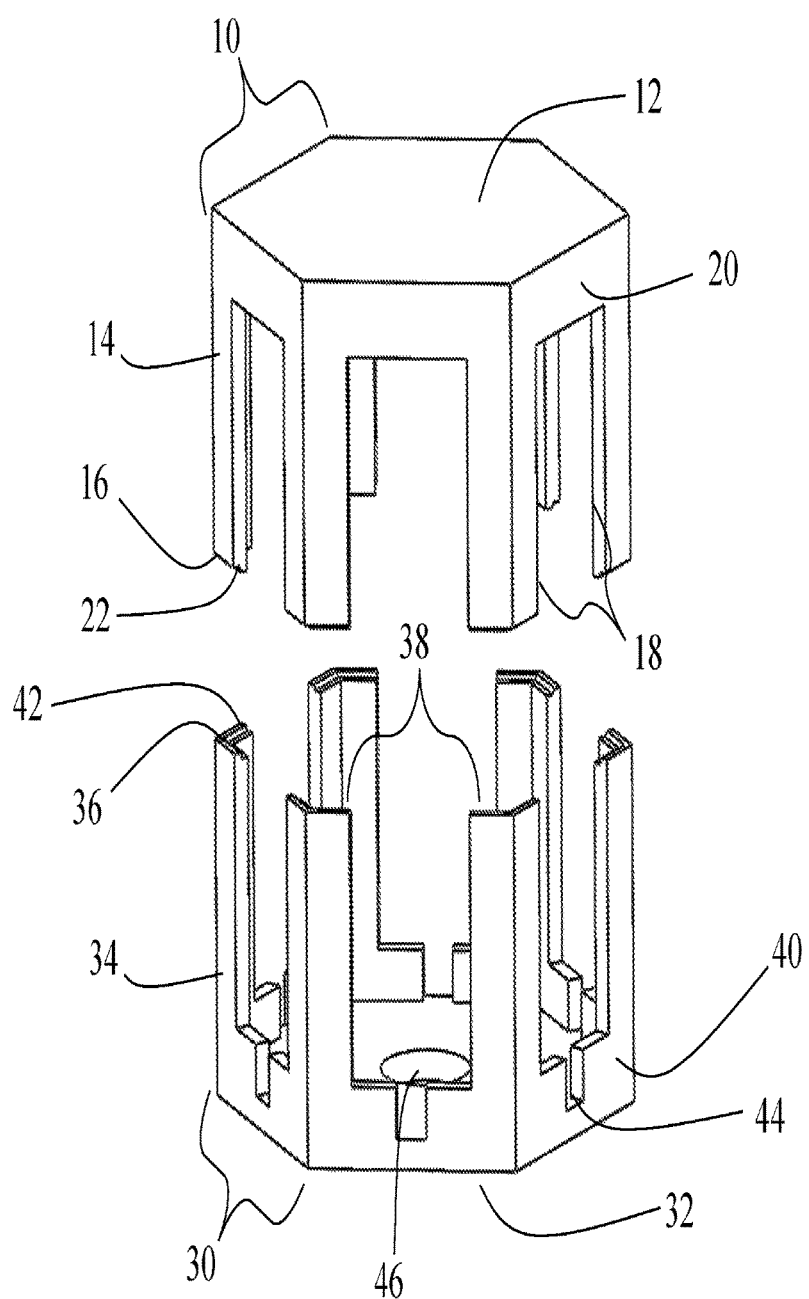
FIG. 2 is a perspective view of hexagonal top module shown in FIG. 1 above a hexagonal bottom module showing the various components of each module.
Figure 3:
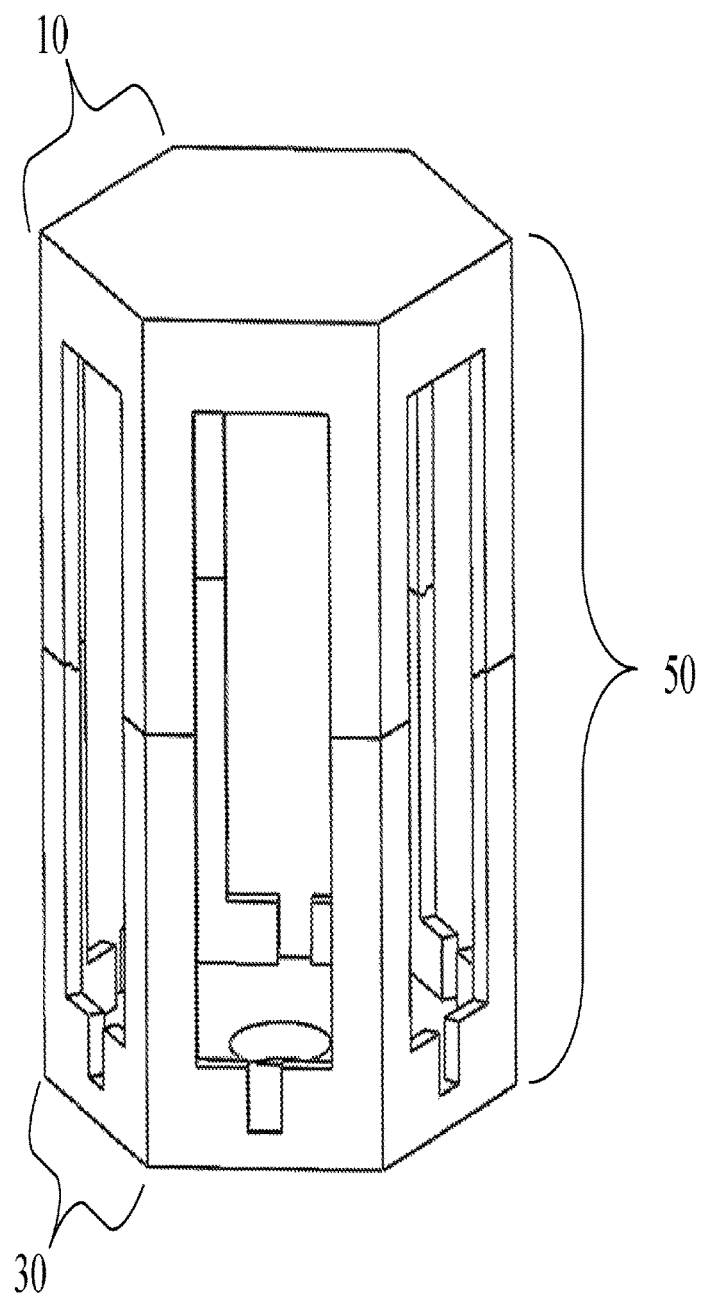
FIG. 3 is a perspective view of the hexagonal top and bottom modules shown in FIG. 2 joined together to assembled hexagonal module.

Referring to FIG. 2, a hexagonal top module 10 can be joined with a hexagonal bottom module 30 to form an assembled hexagonal module 50 as shown in FIG. 3. A hexagonal bottom module 30 is composed of the same components of the hexagonal top module 10 except the module 30 is upside down. The hexagonal bottom module 30 has a floor 32 and six side walls 40. Each wall 40 can also have an optional window 38 that is narrower than the side wall 40 itself. The height of the window 38 can be equal to or less than the height of side wall 40. When two adjacent side walls 40 both have windows 38 the remaining portion of side walls 40 is called the bottom module leg 34.

In order to join together a hexagonal top module 10 with a hexagonal bottom module 30 a male shiplap joint 22 has to be added on the top module bottom of leg 16 and a female shiplap joint 42 had to be added on the bottom module top of leg 36. This male 22 to female 42 shiplap join connection allows the hexagonal top module 10 and hexagonal bottom module 30 to be locked together without risk of horizontal shifting of the two stacked modules which form an assembled hexagonal module 50 as in FIG. 3.

Figure 4:
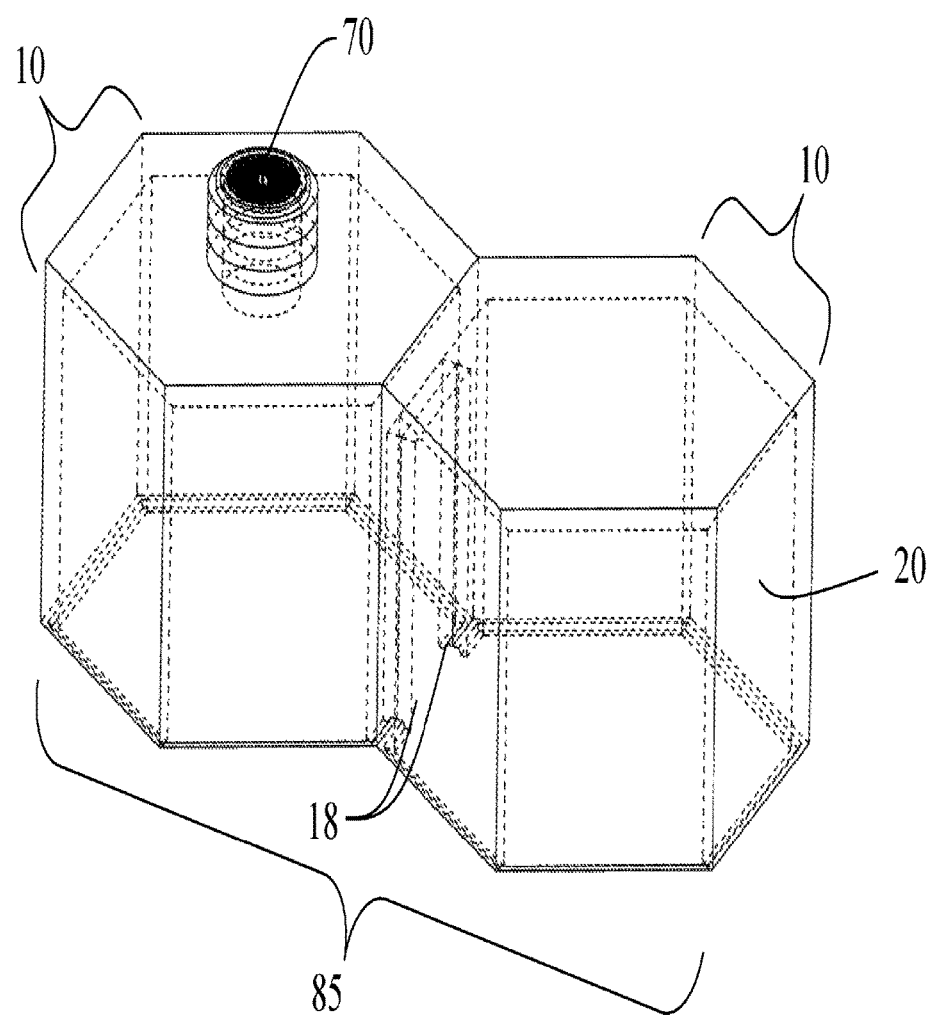
FIG. 4 is a perspective view of a hexagonal top module assembly shown in FIG. 1 and showing windows on sides the modules are adjacent to one another and an access riser and access hatch assembly.

The hexagonal top module can be used in conjunction with other hexagonal top modules 10, placed side by side, to create a honeycomb shaped hexagonal module assembly 85 as in FIG. 4. The assemblies 85 made of hexagonal top modules 10 can only be made so tall due to manufacturing limitations of the hexagonal top modules side wall 20 height. When taller hexagonal module assemblies 90 are required as in FIG. 5 the hexagonal top module 10 can be stacked on top of a hexagonal bottom module 30 to form a taller assembled hexagonal module 50. This taller assembled hexagonal module can be twice as tall as a single hexagonal top module 10 therefore resulting in taller honeycomb shaped hexagonal module assemblies 90 capable of storing larger volumes of water.

Figure 6:
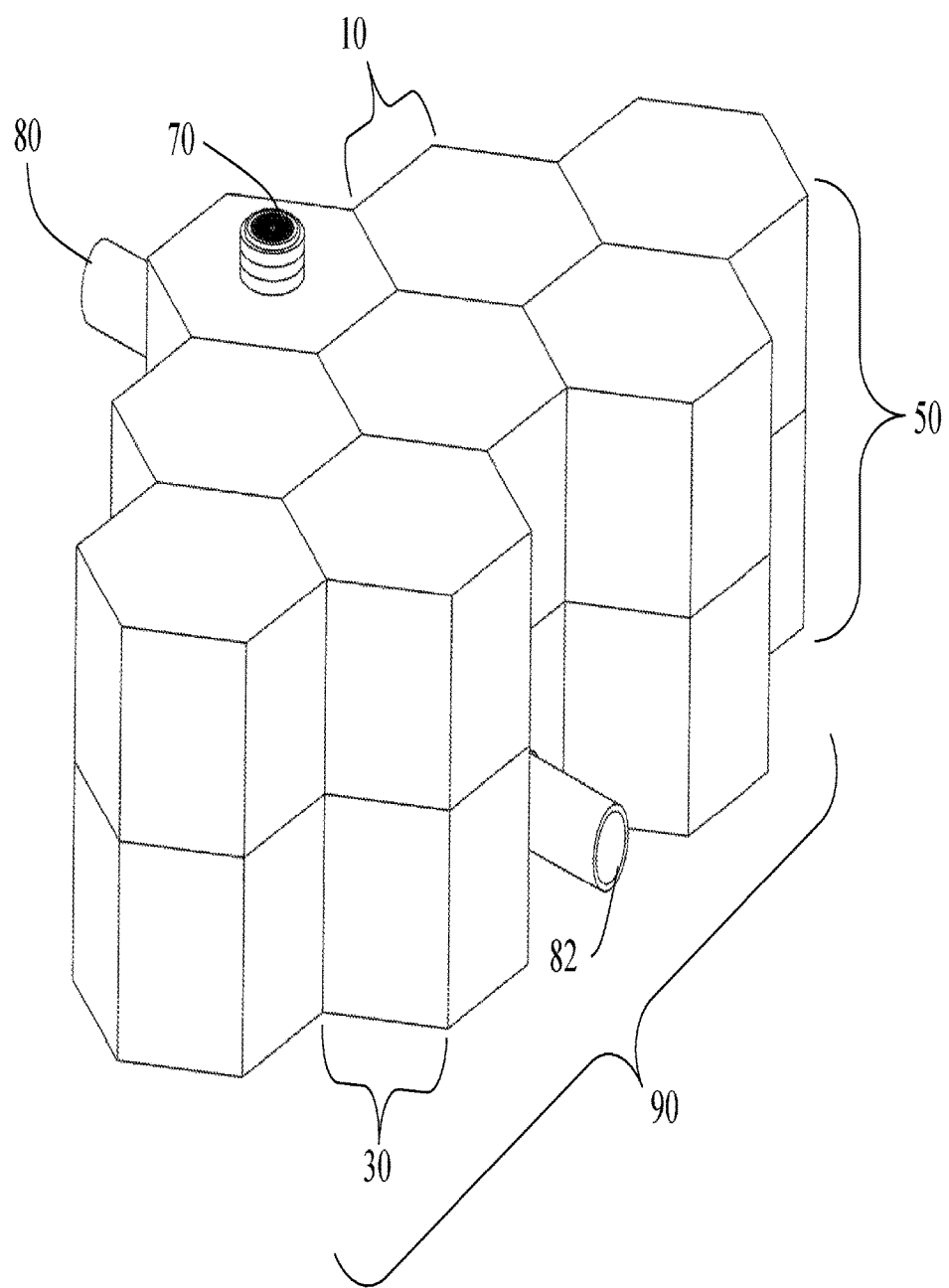
FIG. 6 is a perspective view of a hexagonal module assembly shown in FIG. 5 and showing multiple modules arranged in a honeycomb pattern, an access riser and access hatch assembly, an inflow pipe and an outflow pipe.

The hexagonal module assemblies made of many hexagonal top modules 10 or assembled hexagonal modules 50 are placed side by side in rows to create various shapes that are all arranged in a honeycomb pattern as in FIG. 6. As the number of assembled hexagonal modules 50 grow the more flexibility there is to vary the shape of the assembly 90 into squares, circles, rectangles, L shapes, S shaped, U shaped and other shapes required to fit within the construction site constraints.

Figure 5:
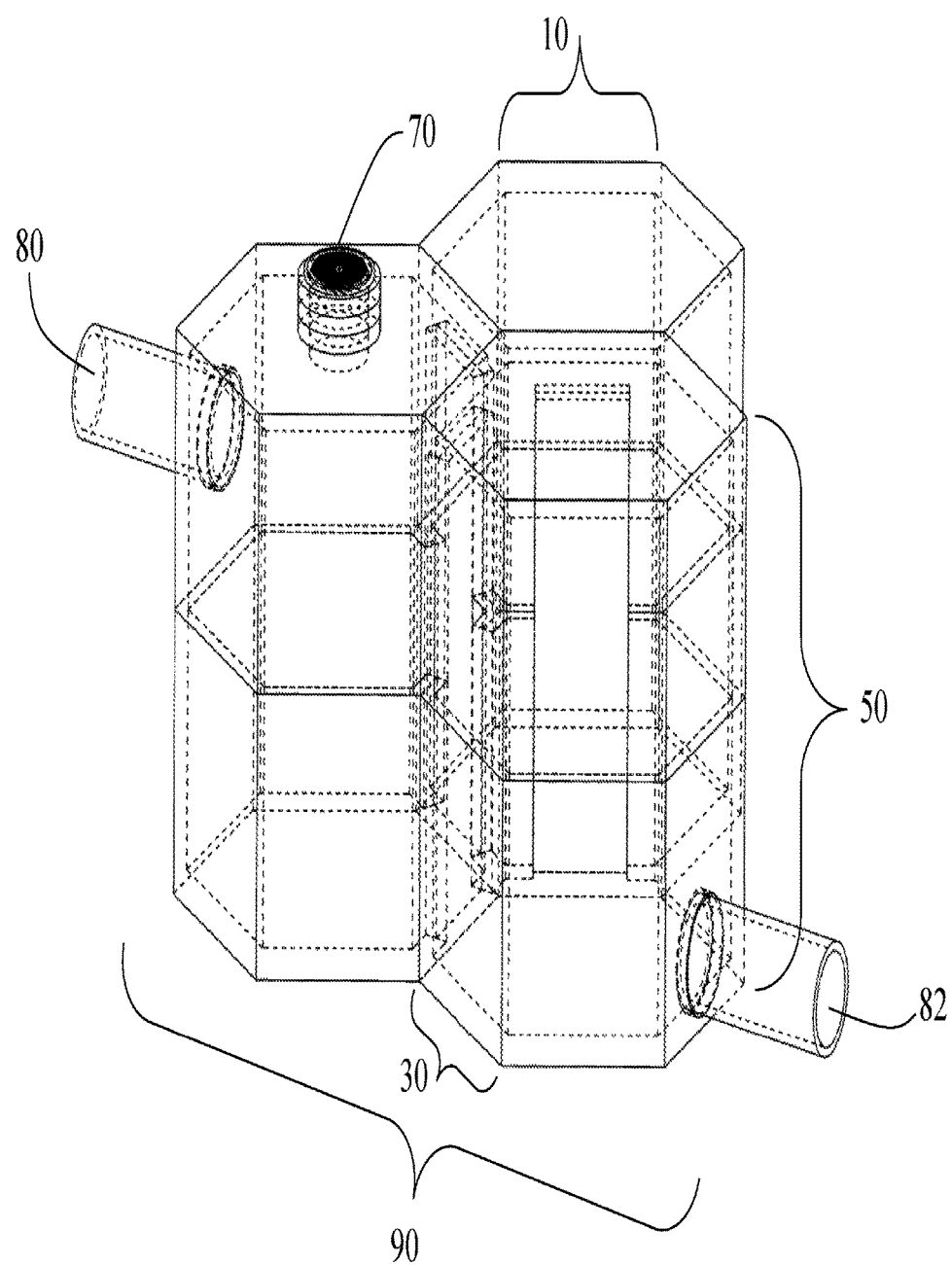
FIG. 5 is a perspective view of the hexagonal top and bottom module assembly shown in FIG. 3 and showing windows on sides the modules are adjacent to one another, an access riser and access hatch assembly, an inflow pipe and an outflow pipe.
Figure 11:
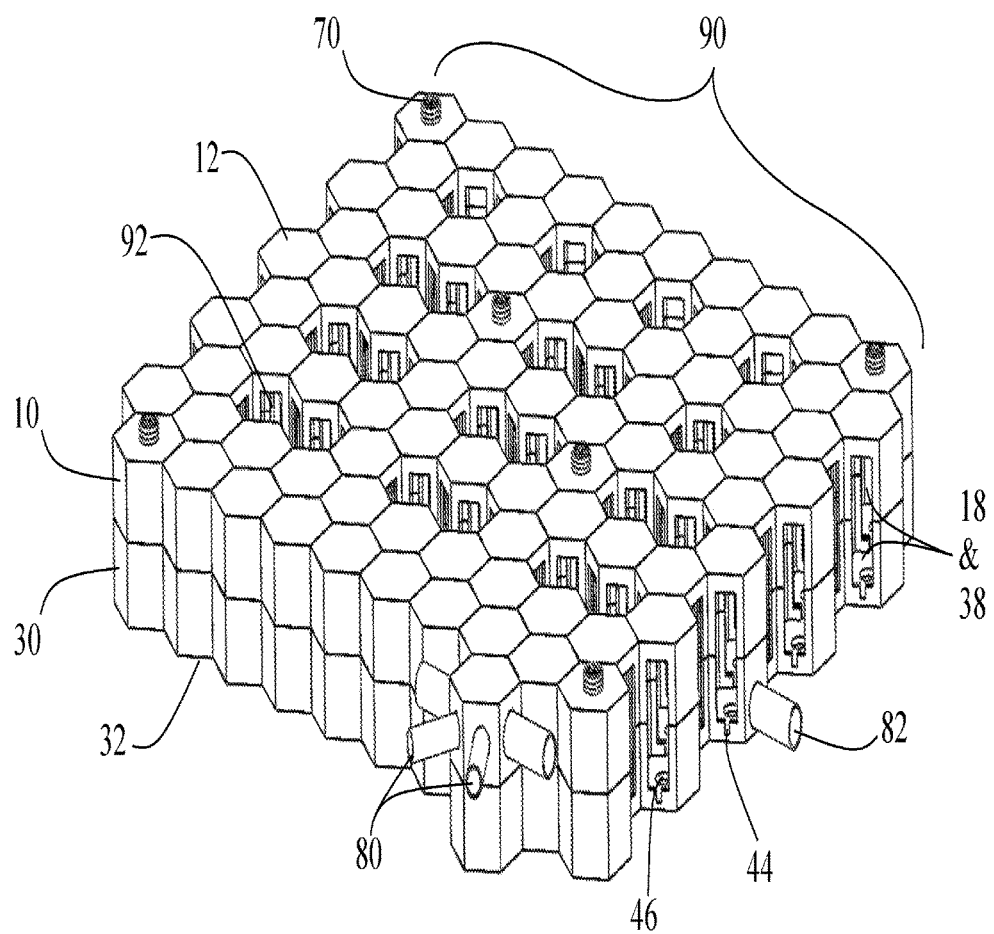
FIG. 11 is a perspective view of a hexagonal module assembly showing the various components including inflow pipes, outflow pipes, access riser and access hatch assemblies, module windows, drainage notch, drainage hole, and hexagonal module assembly internal void areas.

Referring to FIG. 5 and FIG. 11 the individual modules 50 have to be configured so that each module is in fluid communication with one another to allow water to fill up all modules 50 evenly. This is achieved through the use of windows 18 and 38 that can be placed, optionally, in the side walls 20 and 40 of the top 10 and bottom 30 hexagonal modules. All internal modules 10, 30, or 50 have windows 18 and 38 in all six side walls 20 and 40 for water to freely flow in between each module. Modules 10, 30, or 50 located on the perimeter of the hexagonal module assembly 90, will have solid side walls 20 and 40 without windows 18 and 38 as the assembly 90 will be buried underground and be surrounded in soil.

Additionally, to enhance the function of the hexagonal module assembly, features have been added that improve performance, functionality and accessibility of the assembly 90. In one example, located at the bottom of the window 38 in the hexagonal bottom module 30 can be the addition of a drainage notch 44 as in FIG. 2 and FIG. 11 that is substantially narrower than the width of the window 38 and extends from the bottom portion of the window 38 to the module's 30 floor section 32. This is done for potential structural requirements. If the window 38 extended all the way to the floor section 30 there would be less side wall 40 and longer legs 34 which would lessen the module's 30 rigidity. In this example, in which shorter windows 38 are needed for structural reasons, the drainage notch 44 allows water to flow freely between modules 10, 30, 50 all the way to the floor 32. In this manner water can fully drain out from the hexagonal module assembly 90.

Figure 15:
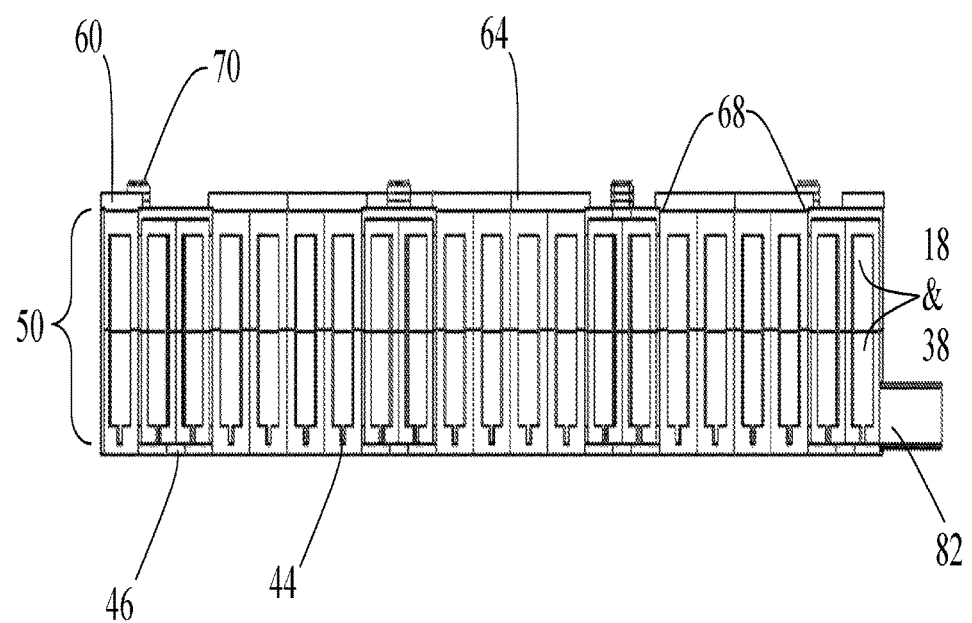
FIG. 15 is a cut-away side view of a completed hexagonal assembly showing the various components from FIG. 10.

In other examples, when infiltration of water back into the native soil below the hexagonal module assembly 90 is desired additional drainage holes 46 as in FIG. 11 and FIG. 15 can be placed in the floor 32 of the bottom module 30. These drainage holes allows water to exit the system evenly throughout every bottom module 30. To connect the module assembly 90, both inflow pipes 80 and outflow pipes 82 as in FIG. 11 through FIG. 13 can be connected to the assembly 90 through any of the module side walls 20 and 40.

Figure 19:
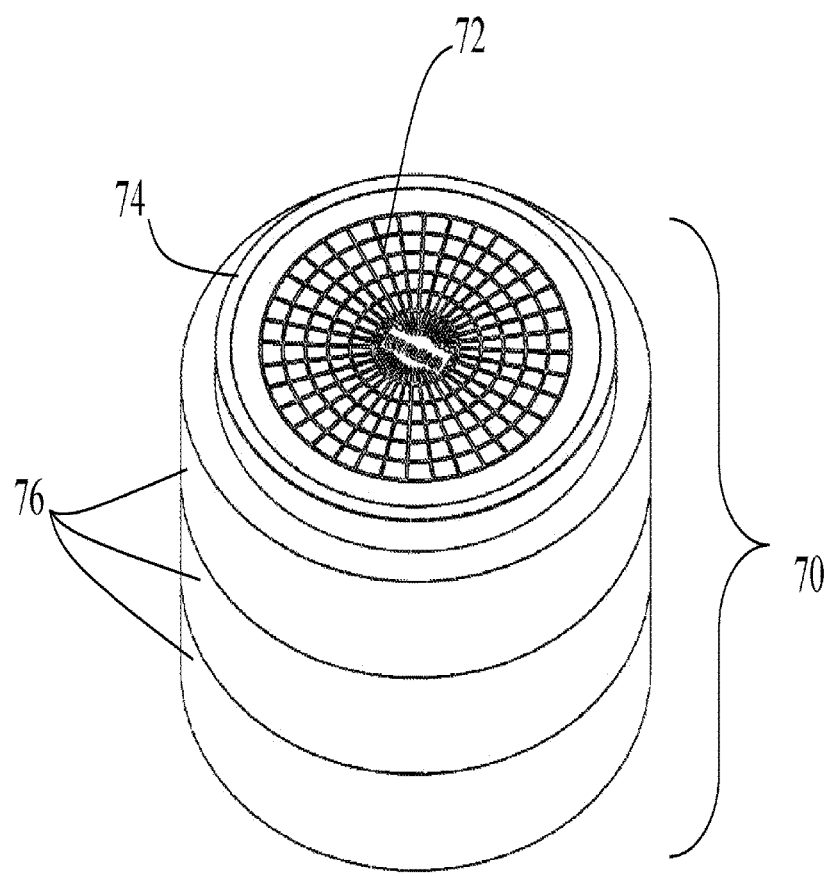
FIG. 19 is a perspective view of the access riser and access hatch assembly consisting of the manhole access cover, manhole access cover frame, and manhole access risers.

Additionally, as in FIG. 11 and FIG. 19 access riser and hatch assemblies 70, which are composed of a manhole cover 72, manhole cover frame 74, and one or more manhole access risers 76 to bring the assembly 70 up to ground level. Access into the module assembly 90 is provided via this access riser and hatch assembly 70 via a hole 6 in the top 12 of the top module 10 as shown in FIG. 1.

Because of the assembly 90 is honeycombed shaped each individual module 10, 30 or 50 along the perimeter is supported and connected by at least two or more adjacent modules 10, 30 or 50, two to three modules 10, 30 or 50 in the corners and four modules 10, 30 or 50 along the sides. The load distribution of this configuration is optimized due the to the honeycomb configuration of the assembly 90. Outer perimeter modules 10, 30 or 50 make contact with other modules 10, 30, or 50 on the two sides and make contact with two additional modules 10, 30, or 50 along the next inner row or column of modules 10, 30, or 50 and the contact is made at sixty degree angles so the load on the perimeter modules 10, 30, or 50 is dispersed evenly to other modules 10, 30, or 50. This even load disbursement provides the overall assembly 90 with maximum compression strength and thus able to handle soil pressures associated with deep installations.

Figure 17:
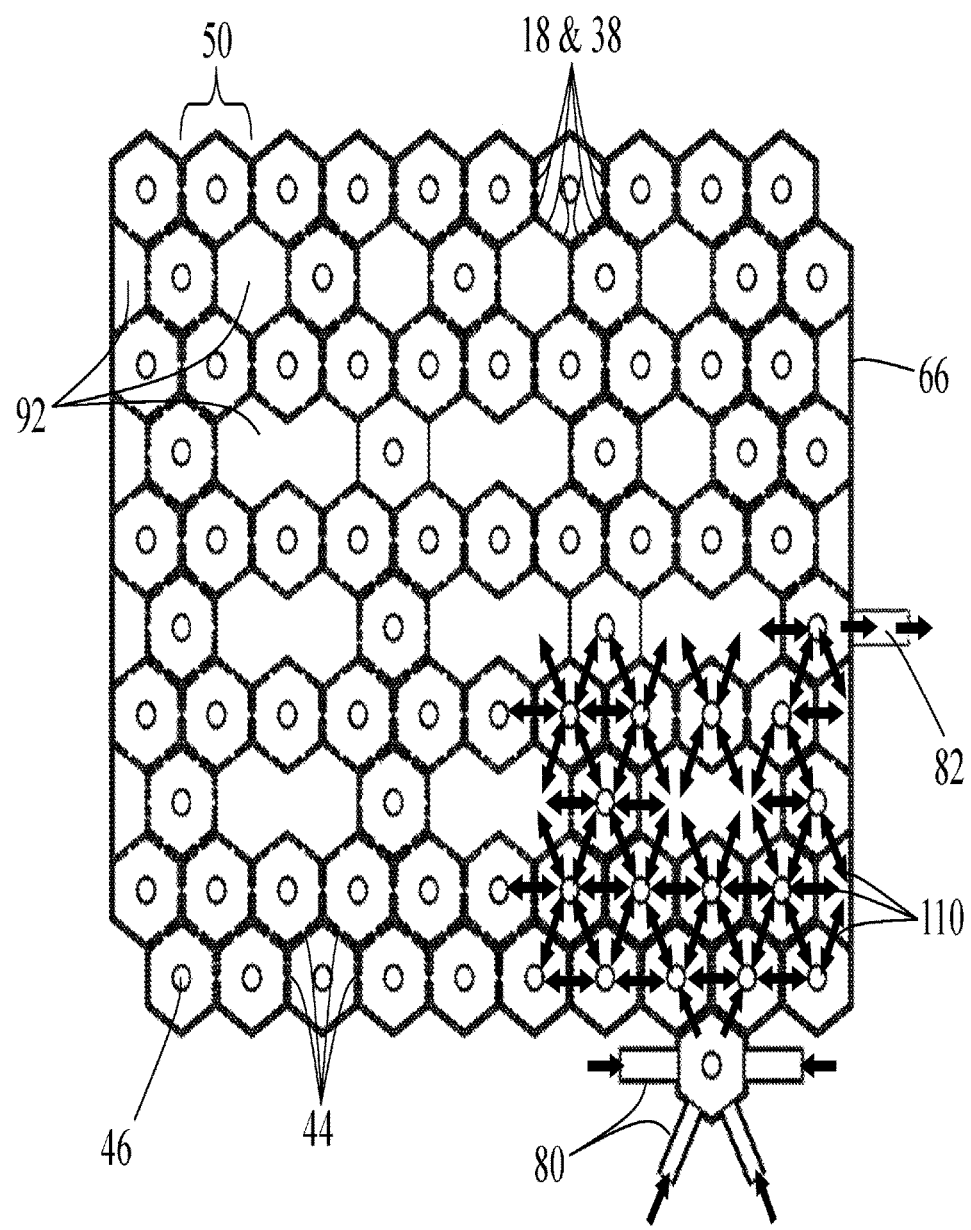
FIG. 17 is a cut-away top view of a completed hexagonal assembly showing the various 235 components from FIG. 8, 9, 10 and illustrating the flow path of water from the inflow pipe, through the perimeter modules which have some solid walls and some windows, internal modules which have windows and all sides, and internal void areas between internal modules, and to the out flow pipe. This figure illustrates how water can flow in, up to, six directions to and from modules to optimal water transfer and disbursement.

Furthermore, referring to FIG. 11 and FIG. 17 because of the load distribution among modules 10, 30, or 50, some of the inner modules 10, 30, or 50 can be removed, usually in a checkerboard pattern for adjacent rows and columns in an assembly 90. The honeycomb shaped pattern of the assembly 90 allows for the removal of the inner modules 10, 30, or 50 without loss of strength. The internal void area 92 reduces the number of modules needed 10, 30, or 50, and reduces the overall cost of the assembly 90. In some cases two adjacent modules 10, 30, or 50 in the same row or same column can be removed without sacrificing strength of the overall assembly 90. Overall the system is more efficient and more economically feasible due to less material being used to store the same amount of water along with decreasing the overall shipping costs that would be associated with additional modules 10, 30, or 50.

Figure 12:
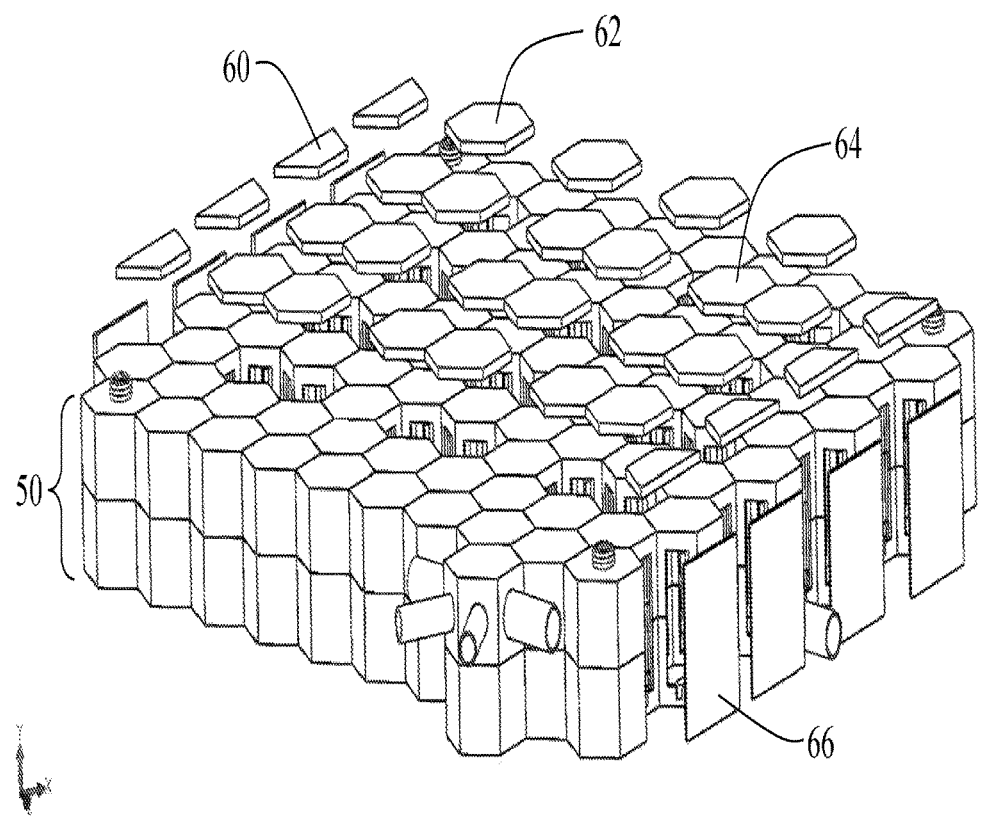
FIG. 12 is a perspective view of a hexagonal module assembly showing the various components including inflow pipes, outflow pipes, access riser and access hatch assembly, hexagonal module assembly internal void areas, hexagonal top slabs (half, single, double), and side wall panels.
Figure 13:
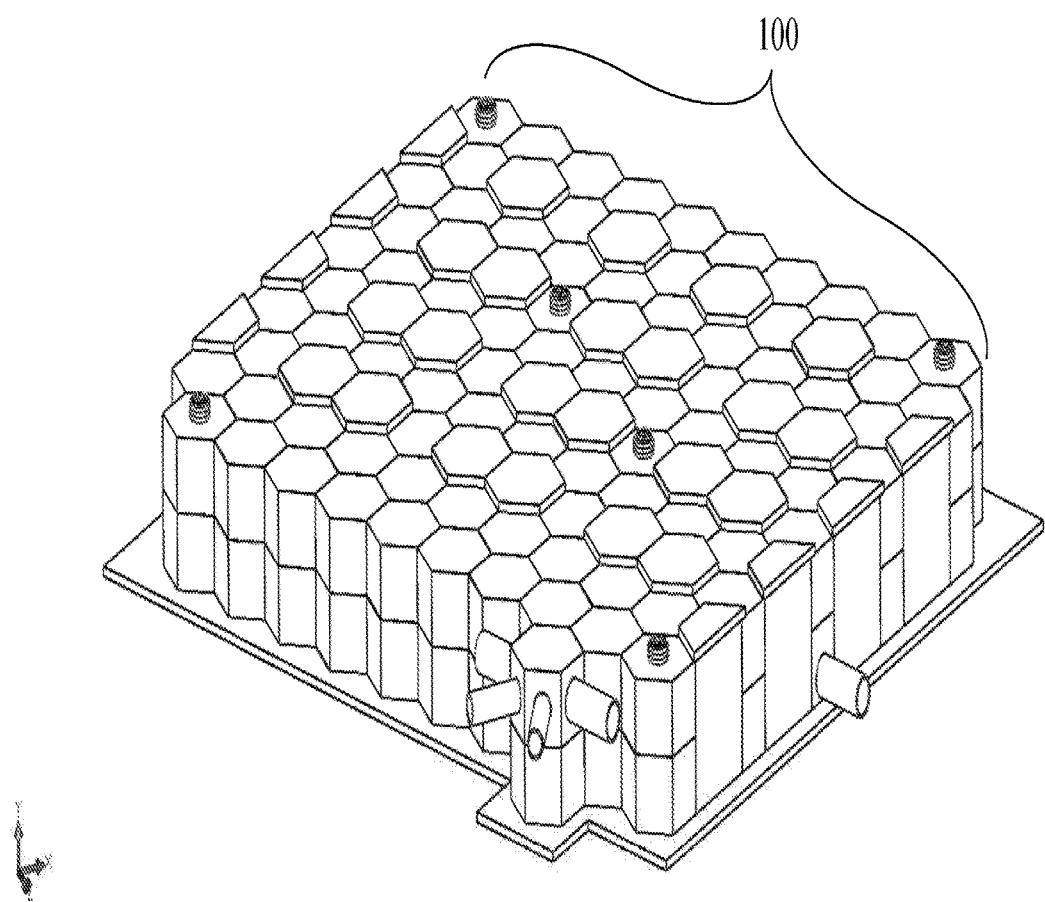
FIG. 13 is a perspective view of a completed hexagonal module assembly showing the various components from FIG. 8, 9.

Referring to FIG. 12 it is shown that additional top slabs are used to cover the module assembly internal void areas 92 to create an enclosed chamber. For locations where a single module 10, 30, or 50 is removed FIG. 8 a hexagonal top slab 62 can be placed over the void 92. For locations where two adjacent modules 10, 30, or 50 are removed FIG. 9 a double hexagonal top slab assembly 64 can be placed to cover the void 92.

Figure 10:
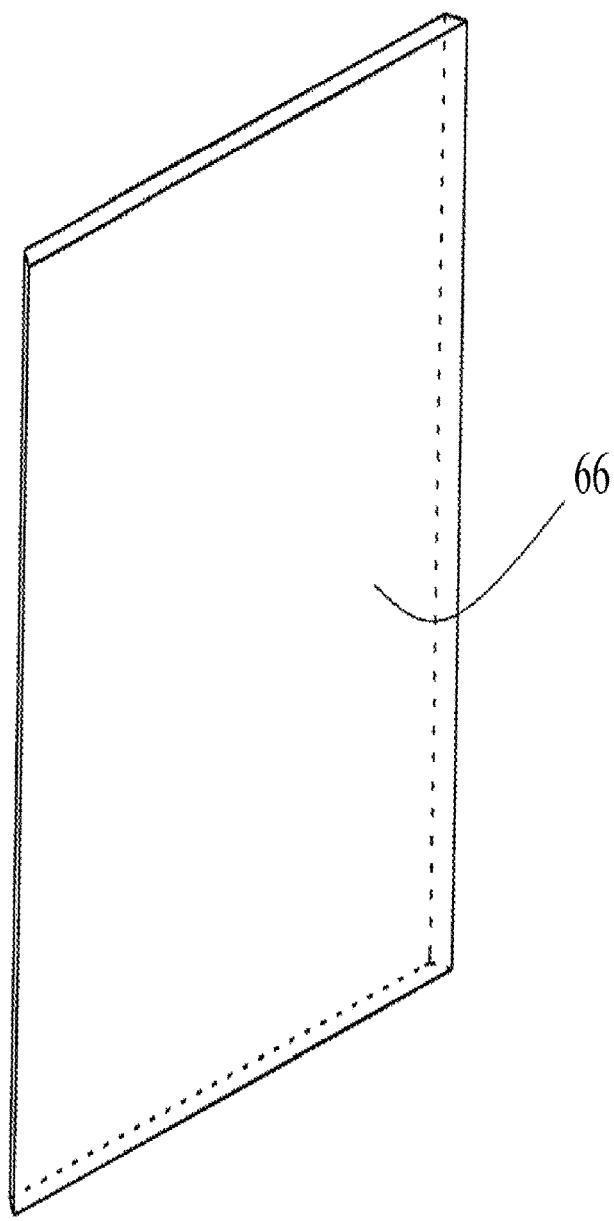
FIG. 10 is a perspective view of a side wall panel used in a completed hexagonal storage system assembly and placed on its perimeter walls and spanning between hexagonal modules in FIG. 1, 2, 3.

Additionally, around the perimeter of the assembly 90 where the individual modules 10, 30, or 50 are arranged in a honeycomb pattern they stick out to create an indented perimeter, FIG. 10 side panels 66 can be placed over these indented areas for additional storage and create a more linear perimeter surface wall. Once these side panels 66 are placed the resulting top of these additional void areas 92 can be covered with a FIG. 7 half-hexagonal top slab 60. The resulting is a FIG. 10 completed hexagonal storage systems assembly 100.

Figure 14:
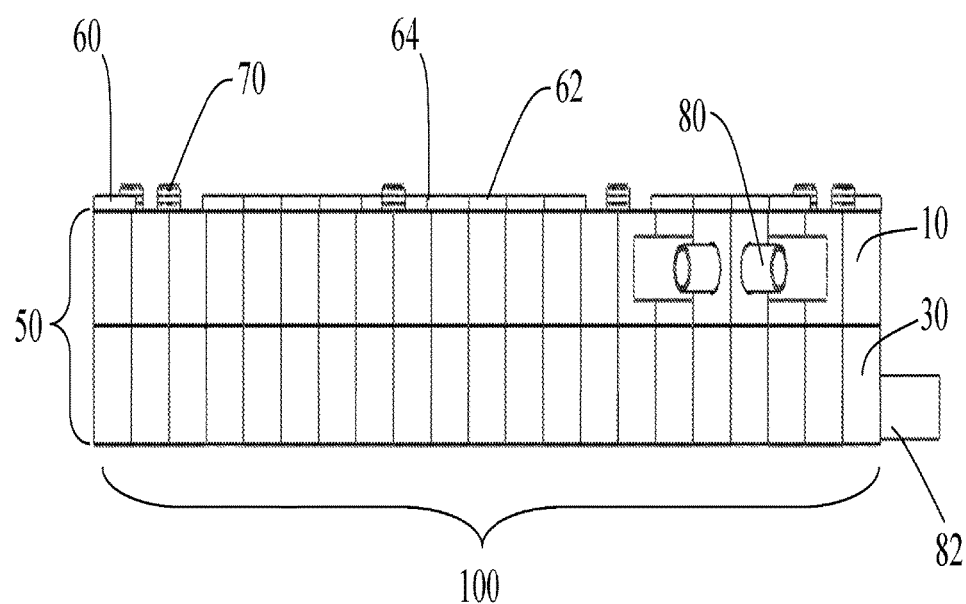
FIG. 14 is a side view of a completed hexagonal module assembly showing the various components from FIGS. 8, 9 and 10.

FIG. 14 is a side-view of the completed hexagonal storage system assembly 100, and shows that multiple inflow pipes 80 and outflow pipes 82 can enter the assembly 100 at various positions on the side walls 20 and 40 of the modules 10, 30 and 50. The position of the various top slabs 60, 62, 64 are also shown sitting above the module top 12 and forming a roof over the completed assembly 100. FIG. 15 is a side-cutaway view of the completed hexagonal storage system assembly 100 showing the internal components of the system including the module windows 18 and 38, the drainage notches 44, drainage holes 46, access riser and access hatch assembly 70 and the top slabs 60, 62, 64. These top slabs are designed with flat top, of various thicknesses to handled surface loading conditions, and further have a notch down 68 on their bottom sides FIG. 7, FIG. 8, FIG. 9, and FIG. 15 to lock it in place when placed over the internal void areas 92. The notch down 68 is slightly narrower than the internal void area 92 on all sides and the top slabs 60, 62, 64 larger than the void areas 92.

Figure 16:
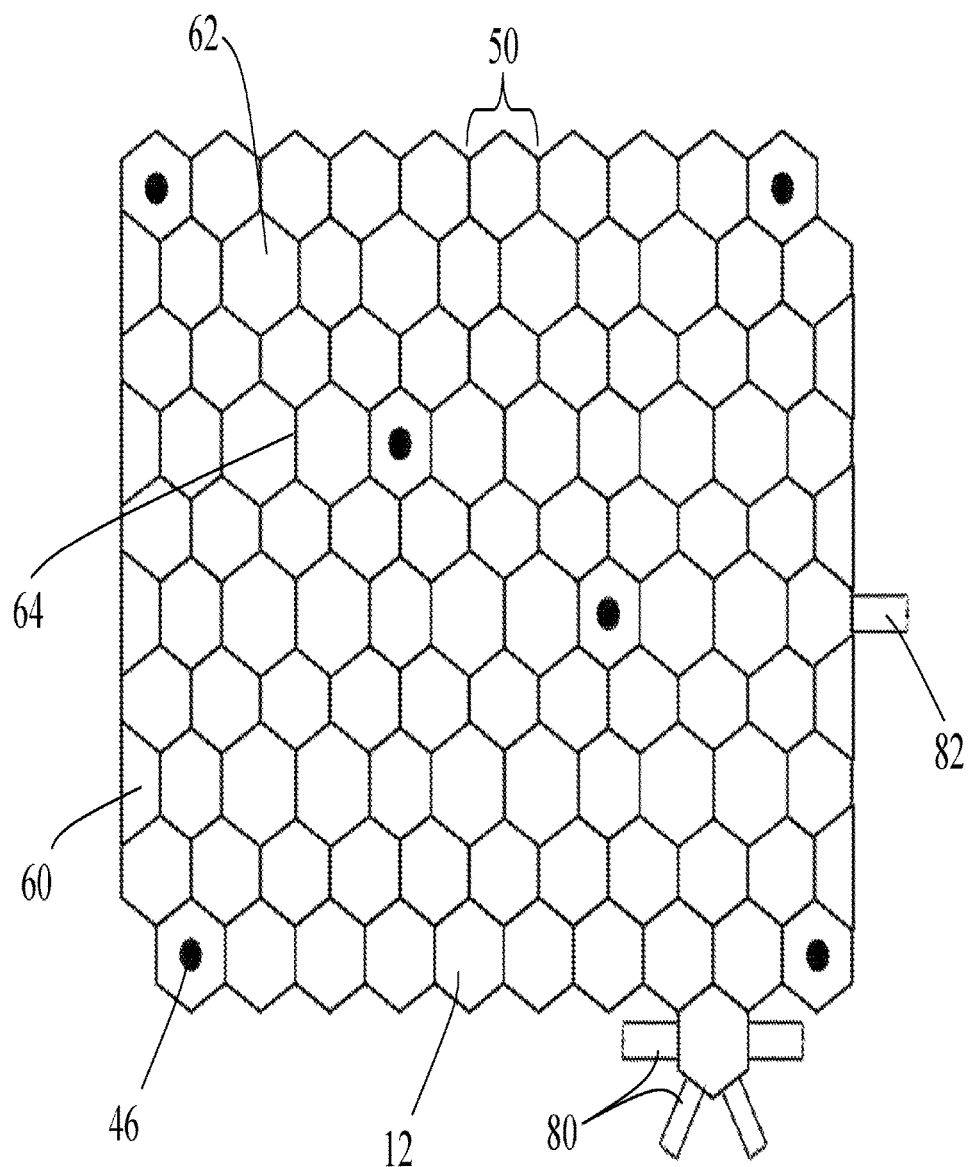
FIG. 16 is a top view of a completed hexagonal assembly showing the various components from FIGS. 8, 9, and 10.

FIG. 16 is a top-view looking down on the complete hexagonal storage system assembly 100 and the resulting honeycomb pattern that is formed. Access riser and access hatch assemblies 70 are positioned throughout key points in individual module tops 12 and allows access into the system 100 through access holes 6 for maintenance and cleaning of the system 100.

FIG. 17 Is a top-cut-away-view showing the internal space of the system 100, including the individual module walls 20 and 40, the associated windows 18 and 38, the internal void areas 92, side wall panels 66 long the two perimeter sides, drainage notches 44 and optional drainage holes 46. Furthermore FIG. 17 shows with arrows how water flows from inflow pipes 80 to a first module 50 and through its windows 18 and 38 and drainage notch 44 when water levels are lower and into adjacent modules 50 and internal void areas 92. Internal modules 50 with six windows 18 and 38 allows water to flow freely in all directions for more efficient distribution of fluid within the completed assembly 100 and eventually exit via the outflow pipe 82 and/or infiltrate back into the soil below via drainage holes 46.

Figure 18:
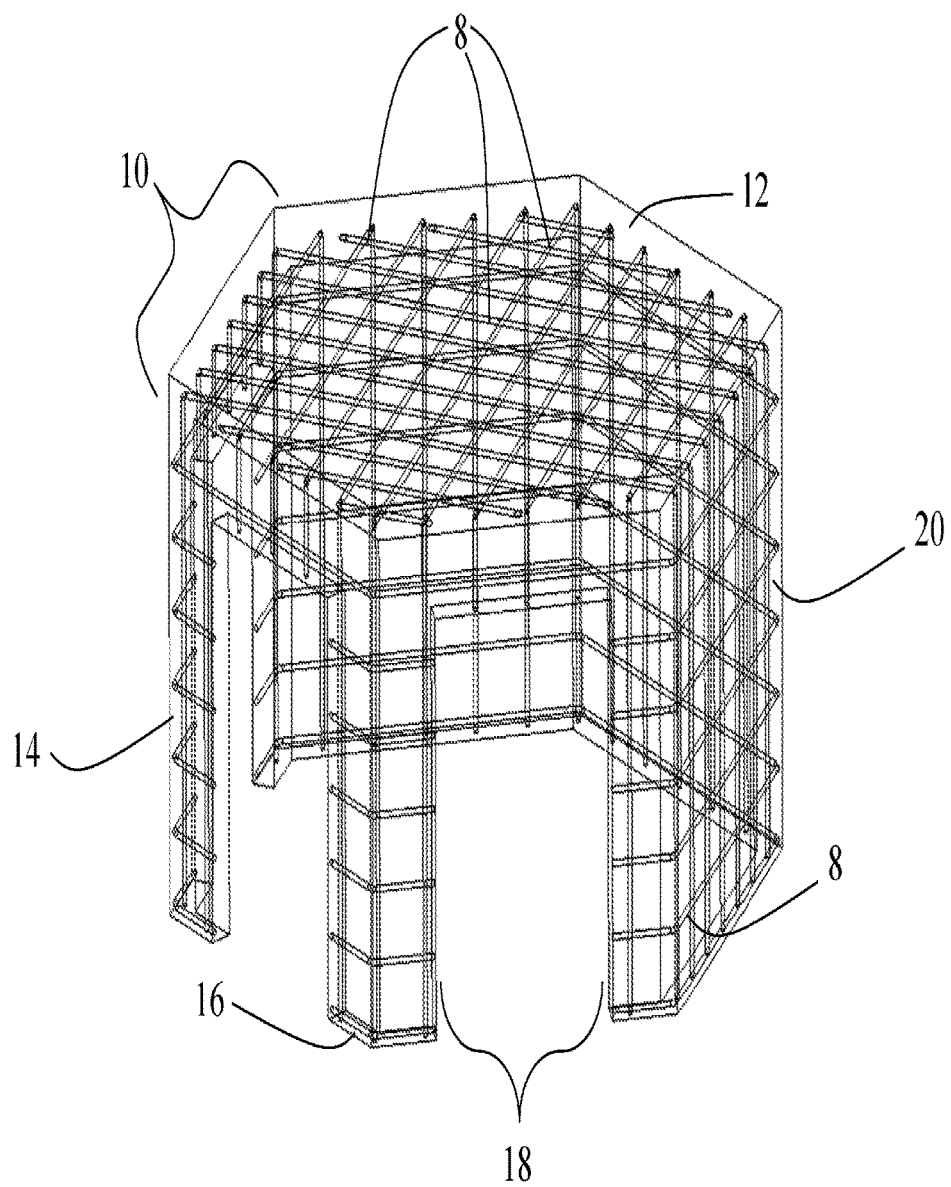
FIG. 18 is a perspective view of the hexagonal top module illustrating the modules top, legs and windows from FIG. 1 showing the internal rebar reinforcement within the concrete module.

FIG. 18 is a depiction of the hexagonal top module and the associated internal metal rebar 8 configuration. For modules 10 made of concrete, the structure has to be reinforced with rebar, rebar mesh 8, oriented in a criss cross pattern, as one example. The rebar 8 should used in the top module's 10 top 12, sides 20 and legs 14. Also, the rebar 8 should used in the bottom module's 30 floor 32, sides 40 and legs 34. The size and amount of rebar 8 is a function of the structure load requirements and soil conditions. This same rebar reinforcement would also be used in top slabs 60, 62, 64 and side wall panel 66 and also including the manhole access risers 76. In other embodiments composite or metal strands can be used in addition to rebar 8 or in place of rebar to reinforce the concrete.

FIG. 19 Shows the three components of the access riser and access hatch assembly 70 which consists of one or more manhole access risers 76 to bring the manhole access cover 72 and frame 74 up to ground level.

Figure 20:
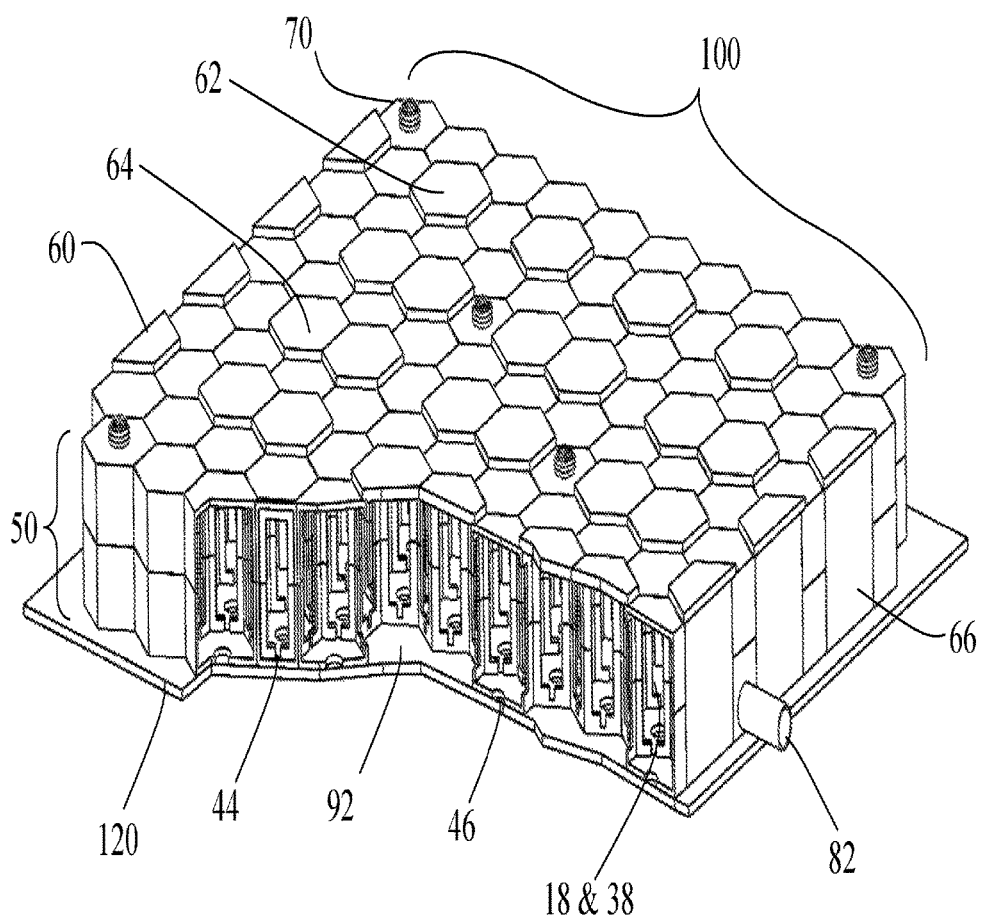
FIG. 20 is a perspective and cut-away view of a completed hexagonal module assembly showing from FIG. 10. shown placed on a gravel base.

In some embodiments, a hexagonal module and assembly of modules FIG. 20 for the underground collection and storage of water are built to handle site specific loading conditions. Surface loads applied to underground storage systems vary based upon pedestrian and vehicular traffic, and can be broken down into the following categories:

Parkway loading includes sidewalks and similar areas that are adjacent to streets and other areas with vehicular traffic. Indirect traffic loading includes areas that encounter daily low speed traffic from vehicles ranging from small cars up to semi-trucks. Direct traffic loading includes areas, such as streets and interstates that encounter a high volume of high speed traffic from vehicles ranging from small cars to large semi-trucks. There is also heavy duty equipment loading that includes traffic from, for example, airplanes and heavy port equipment.

Accordingly, underground storage systems of the present invention may be constructed having walls, floors, and/or ceilings of various thicknesses and strengths (e.g., differing thicknesses of concrete or steel or differing amounts of rebar) such that they achieve a parkway load rating (e.g., a H 10 load rating), an indirect traffic load rating (e.g., a H20 load rating), a direct traffic load rating (e.g., a H20 load rating), or a heavy duty equipment load rating (e.g., a H25 load rating), as required for a given installation site.

Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

We claim:

1. A honeycomb shaped assembly system for storing water underground, wherein the honeycomb shaped assembly system is comprised of a plurality of individual adjoining hexagonal modules,
    wherein each hexagonal module is comprised of hexagonally-shaped top, a hexagonally-shaped bottom wherein the top and bottom are connected to side walls on opposite ends, and said side walls are all of equal length and width,
    wherein said side walls contain windows based upon their position within the assembly,
    wherein said window is is equal to or shorter than the height of the side wall,
    said hexagonal modules assembled in such a manner that all modules are in fluid connection with one another via windows,
    wherein said honeycomb shaped assembly containing modules along the assembly perimeter, with walls not in contact with walls of other modules are without windows such that the overall assembly is generally impervious around it's perimeter, top and bottom thus allowing the overall system to hold water or other fluids internally within its entirety,
    wherein said modules of honeycomb shaped assembly are arranged as a regular hexagonal tiling in which three hexagons meet at each vertex such that all walls of all modules are of the same width and are assembled such that walls of adjacent modules are lined up symmetrically with walls of all other modules, resulting in only 120 degree angles at each vertex of all adjoined hexagonal modules so three hexagonal modules at a point make a full 360 degrees,
    wherein at least one said module has an access hole in its top for access into said honeycomb shaped assembly system after installation underground.

2. A honeycomb shaped assembly system of claim 1, wherein the module is composed of a top module with more than one perpendicularly downward extending walls and an open bottom, a bottom module with more than one perpendicularly upward extending walls and an open top, said top module is stacked directly over the bottom module and secured in place utilizing a pair of male and female shiplap joints or similar placed at the bottom edge of the side walls of the hexagonal top module and the top edge of the side walls of the bottom module, respectively.

3. A honeycomb shaped assembly system of claim 1, containing one or more inflow and/or outflow pipes in module top or side wall.

4. A honeycomb shaped assembly system of claim 1, containing drainage notches in said windows that extend from the bottom of the window to the module bottom to allow water to drain fully down and while providing more wall area to increase overall strength of module.

5. A honeycomb shaped assembly system of claim 1, containing drainage holes in the bottom of said module to allow water to exit the system and percolate into underlying gravel layer or soils.

6. A honeycomb shaped assembly system of claim 1, in which up to 30% of internal modules are removed without reducing the overall assembly strength and resultant internal void areas are covered by a top slab larger than the resultant void area of the removed module(s), said top slab having a notch down on its bottom side that is smaller than the void area to lock it in place within the assembly.

7. A honeycomb shaped assembly system of claim 1, in which vertically extending side panels are added to the external perimeter of the assembly.

8. A honeycomb shaped assembly system of claim 1, where the top module, bottom module, top slab, and side panel are all comprised of concrete reinforced with rebar.

9. A honeycomb shaped assembly system of claim 1, with a top access hole covered by an access frame and cover and includes access risers to extend the access frame and cover to finish surface from the top access hole located underground.

10. A honeycomb shaped assembly system of claim 1, made water tight using an impervious liner, sealant or other means to prevent leakage.

11. A honeycomb shaped assembly system of claim 1, wherein a top access hole is covered with an access frame and cover.

12. A honeycomb shaped assembly system for storing water underground, wherein the honeycomb shaped assembly system is comprised of a plurality of individual adjoining hexagonal modules,
    wherein each hexagonal module is comprised of a hexagonally-shaped top,
    wherein the top is connected to one or more side walls, and said side walls are all of equal length and width,
    wherein side walls contain windows based upon their position within the assembly,
    wherein said window is equal to or shorter than the height of the side wall, said hexagonal modules assembled in such a manner that all modules are in fluid connection with one another via windows,
    wherein said honeycomb shaped assembly containing modules along the assembly perimeter, with walls not in contact with walls of other modules are without windows such that the overall assembly is generally impervious around it's perimeter, top thus allowing the overall system to hold water or other fluids internally within its entirety,
    wherein said modules of honeycomb shaped assembly are arranged as a regular hexagonal tiling in which three hexagons meet at each vertex such that all walls of all modules are of the same width and are assembled such that walls of adjacent modules are lined up symmetrically with walls of all other modules, resulting in only 120 degree angles at each vertex of all adjoined hexagonal modules so three hexagonal modules at a point make a full 360 degrees.

13. A honeycomb shaped assembly system of claim 12, wherein the module is composed of a top module with more than one perpendicularly downward extending walls and an open bottom, said module is placed on a dirt, a gravel based or a concrete slab.

14. A honeycomb shaped assembly system of claim 12, containing one or more inflow and/or outflow pipes in module top or side wall.

15. A honeycomb shaped assembly system of claim 12, in which up to 30% of internal modules are removed without reducing the overall assembly strength and resultant internal void areas are covered by a top slab larger than the resultant void area of the removed module(s), said top slab having a notch down on its bottom side that is smaller than the void area to lock it in place with the assembly.

16. A honeycomb shaped assembly system of claim 12, in which vertically extending side panels are added to the external perimeter of the assembly on sides of the assembly.

17. A module assembly system of claim 12, where the top module, top slab, and side panel are all comprised of concrete reinforced with rebar.

18. A honeycomb shaped assembly system of claim 12, with a top access hole covered by an access frame and cover and includes access risers to extend the access frame and cover to finish surface from the top access hole located underground.

19. A honeycomb shaped assembly system of claim 12, set on a concrete slab and made water tight using an impervious liner, sealant or other means to prevent leakage.

20. A honeycomb shaped assembly system of claim 12, wherein a top access hole is covered with an access frame and cover.

21. A method of assembling a hexagonal top module assembly system using only hexagonal top modules comprised of the steps of identifying the shape of the hexagonal module assembly desired, selecting and assembling the needed number of hexagonal top modules possessing side walls with windows, hexagonal top modules without windows, hexagonal top modules with top access holes, and hexagonal top modules with inflow pipes,
excavating the site for assembly of the hexagonal top module assembly,
placing dirt, concrete or rock on the floor of said excavated site,
placing one or more of the hexagonal top modules together, open end down such that their side walls press directly against each other,
arranging said hexagonal top modules such that the exterior modules define the perimeter of the overall assembly have no side windows, that the hexagonal top modules, each have one or more side windows facing each other's side windows, wherein said modules of honeycomb shaped assembly are arranged as a regular hexagonal tiling in which three hexagons meet at each vertex such that all walls of all modules are of the same width and are assembled such that walls of adjacent modules are lined up symmetrically with walls of all other modules, resulting in only 120 degree angles at each vertex of all adjoined hexagonal modules so three hexagonal modules at a point make a full 360 degrees,
arranging that at least one hexagonal top module possesses atop access hole and that at least one exterior hexagonal top module possesses an inflow pipe,
wherein side panels and cover panels are added to the hexagonal module assembly system,
filling in the surrounding area of said excavation with rock and gravel, covering over the hexagonal module assembly system with dirt or other coverings.

22. The method according to claim 21 of assembling a top module assembly system with internal void areas comprised of the additional steps of identifying the location of the void area(s) in the module assembly, covering the internal void with a plurality of top slabs and adding a plurality of side panels to the gaps left by the walls left by the exterior bottom modules.

23. A method of assembling a hexagonal top and bottom module assembly system comprised of the steps of
identifying the shape of the hexagonal module assembly desired,
selecting and assembling the needed number of hexagonal top and bottom modules possessing side walls with windows, hexagonal top and bottom modules without windows, hexagonal top modules with top access holes, hexagonal bottom modules with drain holes, hexagonal top modules with inflow pipes and/or outflow pipes, and hexagonal bottom modules include inflow and outflow pipes,
excavating the site for assembly of the hexagonal top module assembly,
placing dirt, concrete or rock on the floor of said excavated site,
placing one or more hexagonal bottom modules together, open end up such that their side walls press directly against each other,
arranging said hexagonal bottom modules such that the exterior modules define the perimeter of the overall assembly have no side windows,
wherein the hexagonal bottom modules, each have one or more side windows facing each other's side windows, wherein said modules of honeycomb shaped assembly are arranged as a regular hexagonal tiling in which three hexagons meet at each vertex such that all walls of all modules are of the same width and are assembled such that walls of adjacent modules are lined up symmetrically with walls of all other modules, resulting in only 120 degree angles at each vertex of all adjoined hexagonal modules so three hexagonal modules at a point make a full 360 degrees,
arranging that at least one hexagonal bottom module possesses a drainage hole and that at least one exterior hexagonal bottom module possesses an outflow pipe,
adding a hexagonal top module to each hexagonal bottom module in the module assembly system, using the module connection means,
arranging that at least one hexagonal top module possesses atop access hole and that at least one exterior hexagonal top module possesses an inflow pipe, covering the internal void with a plurality of hexagonal top slabs,
adding a plurality of side panels to the gaps left by the walls left by the exterior hexagonal bottom modules,
filling in the surrounding area of said excavation with rock and gravel, covering over the hexagonal top and bottom module assembly system with dirt or other coverings.

24. The method according to claim 23, including the additional steps of identifying the location of the void area(s) in the module assembly, covering the internal void with a plurality of top slabs, adding a plurality of side panels to the gaps left by the walls left by the exterior bottom modules.

* * * * *